(12) United States Patent
Shaffer et al.

(10) Patent No.: US 6,351,636 B2
(45) Date of Patent: *Feb. 26, 2002

(54) SYSTEM AND METHOD FOR AUTOMATIC AREA CODE UPDATING

(75) Inventors: Shmuel Shaffer, Palo Alto; William Joseph Beyda, Cupertino, both of CA (US)

(73) Assignee: Siemens Information and Communications Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,404

(22) Filed: Oct. 29, 1997

(51) Int. Cl.[7] .................. H04M 11/00; H04M 3/42; H04M 1/00; H04M 3/00; H04Q 7/20
(52) U.S. Cl. .............. 455/414; 455/414; 455/92.04; 455/218.01; 455/372; 379/93.01; 379/92.03
(58) Field of Search ................... 379/115, 125, 379/219–220, 222, 224, 229, 242–243, 257–258, 279–280, 216, 207, 355, 356, 357, 93.1, 372; 455/414, 418, 419

(56) References Cited

U.S. PATENT DOCUMENTS

| 4,447,676 A | * | 5/1984 | Harris et al. ................. 379/199 |
| 4,833,702 A | * | 5/1989 | Shitara et al. ................. 379/60 |
| 5,259,026 A | | 11/1993 | Johnson |
| 5,455,858 A | | 10/1995 | Lin |
| 5,528,680 A | * | 6/1996 | Karpicke ..................... 379/355 |
| 5,594,945 A | | 1/1997 | Lewis et al. |
| 5,623,541 A | * | 4/1997 | Boyle et al. ................. 379/134 |
| 5,644,625 A | * | 7/1997 | Solot ............................ 379/88 |
| 5,754,636 A | * | 5/1998 | Bayless et al. ............. 379/142 |
| 5,764,639 A | * | 6/1998 | Staples et al. .............. 370/401 |

* cited by examiner

*Primary Examiner*—Thanh Cong Le
*Assistant Examiner*—Meless Zewdu

(57) ABSTRACT

A system for updating area code information in predetermined telecommunications devices and networks as newly created area codes are implemented. Area code lists may be updated automatically and without the need for human intervention or manual reprogramming. A message receiving unit monitors the telephone connection and determines whether a "new area code" message is being transmitted by the telephone company central office or carrier. A message decoding unit decodes the transmitted message into a required format for a predetermined device. An update unit enables the area code lists to be automatically updated in the predetermined device if a list comparator determines that the area code does not exist in the lists.

12 Claims, 8 Drawing Sheets

SYSTEM AND METHOD FOR AUTOMATIC AREA CODE UPDATING

BACKGROUND OF THE INVENTION

1. Field of the Invention

This invention relates to telecommunications systems and, more particularly, to an area code updating system for automatically reprogramming telecommunications devices with new area codes.

2. Description of the Prior Art

It is well known that advances in technology have led to an explosive proliferation in various telecommunications devices such as FAX machines, modems, pagers and cellular phones throughout the United States and the world. This growth has resulted in a severe shortage of available telephone numbers, resulting in the need for the rapid creation of new area codes. For example, the United States saw the introduction of 21 new area codes in 1996, and will see the further introduction of at least 37 more new area codes in 1997. By the year 2000, it is estimated that at least one new area code will be created every week. Furthermore, it is estimated that in 5–10 years, 10 digit phone numbers will be exhausted and 15 digit phone numbers will have to be implemented. Unfortunately, each change in area code or telephone number presently requires manually updating telecommunications systems.

In particular, additions or changes to telephone area codes requires individual reprogramming of several types of equipment, including private branch exchanges (PBX), call accounting systems, voice mail systems, speed dial lists in facsimile (FAX) machines, network management systems, dial up routers, communications software and integrated services digital network (ISDN) devices and terminal adapters (TA), hereinafter telecommunications devices. If these telecommunications devices are not reprogrammed, access to telephone lines in the regions undergoing area code changes becomes inconvenient, if not impossible. Generally, a service technician or an onsite communications manager must manually update the system with the new area codes as needed.

Unfortunately, manual reprogramming of telecommunications systems and devices can be expensive, time-consuming and inconvenient, particularly in light of the rapid creation of the many new area codes. For example, reprogramming area code lists currently may require that the service technician or communications manager travel to each of the device locations and manually program the new area codes into each of the devices.

Therefore, there is a need for an updating system wherein telecommunications networks and devices may be automatically reprogrammed with new area code information without the need for manual intervention.

SUMMARY OF THE INVENTION

Briefly, the present invention relates to a system and method for automatically updating area code information in telecommunications devices and networks as newly created area codes are implemented. The system in accordance with the present invention may be typically resident within the telecommunications device and includes a message receiving unit, a message decoding unit and an update unit. In particular, the message receiving unit monitors the telephone connection and determines whether a "new area code" message is being transmitted by the telephone company central office or carrier. The message decoding unit then translates the message, if needed, into a form usable for a particular device. The update unit then checks the internal area code lists of the device to determine whether the new area code has already been added to the device's lists and enables the area code lists to be automatically updated if the area code is found to not exist in the lists.

In one embodiment of the invention, area code updating messages may be received directly by certain digital devices. Therefore, when such an update message is received, the device can compare the new area code against its preexisting list to determine whether the new area code needs to be added. If the new area code is not present in the existing lists, the lists are updated as needed.

In another embodiment of the invention, area code updating commands may be received by analog devices as a Calling Number Delivery message. The area code and number is checked against an existing list within the analog device. If the area code is not already present in the list, the device is able to update its list based on the information provided by the Calling Number Delivery message.

BRIEF DESCRIPTION OF THE DRAWINGS

A better understanding of the present invention is obtained when the following detailed description is considered in conjunction with the following drawings in which.

DETAILED DESCRIPTION OF THE INVENTION

The present invention relates to a system for enabling telecommunications devices to automatically update their area code lists. Area code updating is achieved in a telecommunications device or network by receiving an "area code update" message from the telephone company central office (CO) when the device first attempts to place a call to an area undergoing an area code change.

In particular, area code changes typically occur in four distinct phases. In a first transitional phase, when the directory number is unique, no notification by telephone is given to the call originator that the area code of the dialed number is changing. The call is simply completed. The first phase typically lasts two to three months. In a second transitional phase, when the directory number is still unique, the CO 10 notifies the caller in a prerecorded telephone message that the number that is being called is changing to area code "x", for example. The second phase also typically lasts two to three months. In a third transitional phase, the CO 10 notifies the caller that the area code has changed to 'x', but leaves it to the user to redial the number with the proper updated area code and directory number. Typically, the first, second and third phases last two to three months each. Finally, in a fourth and final phase, the area code update is completed and the CO 10 notifies the caller that the area code for the number has changed and provides the new area code, notifies the caller that the number is not in service, or possibly connects the call to the wrong number if that number has been reassigned.

Thus, when the system of the present invention determines that the new area code is not yet in its list, the device or network will accept the area code update message sent by the CO, translate the message into the appropriate format and update the device's area code list accordingly. Therefore, the present invention enables the device or network to learn the upcoming new area code during the transition phases before it is required to know the new area code in the final phase.

Furthermore, the present invention may also be used to enable updating of other telephone number information in devices having signaling capability. In particular, devices which typically have signaling capability include PBXs, routers, digital devices and ISDN devices, such as FAX machines and phones. Signaling operates in a manner similar to an analog phone ringing. However, instead of the phone company sending a ring voltage to ring the bell in the phone, it sends a digital packet on a separate channel. Therefore, the signal does not disturb established connections. The signaling indicates who is calling, whether it is a data or voice call, and the number dialed. Based on that information, the device then makes a decision on how to direct the call.

Figure 1:
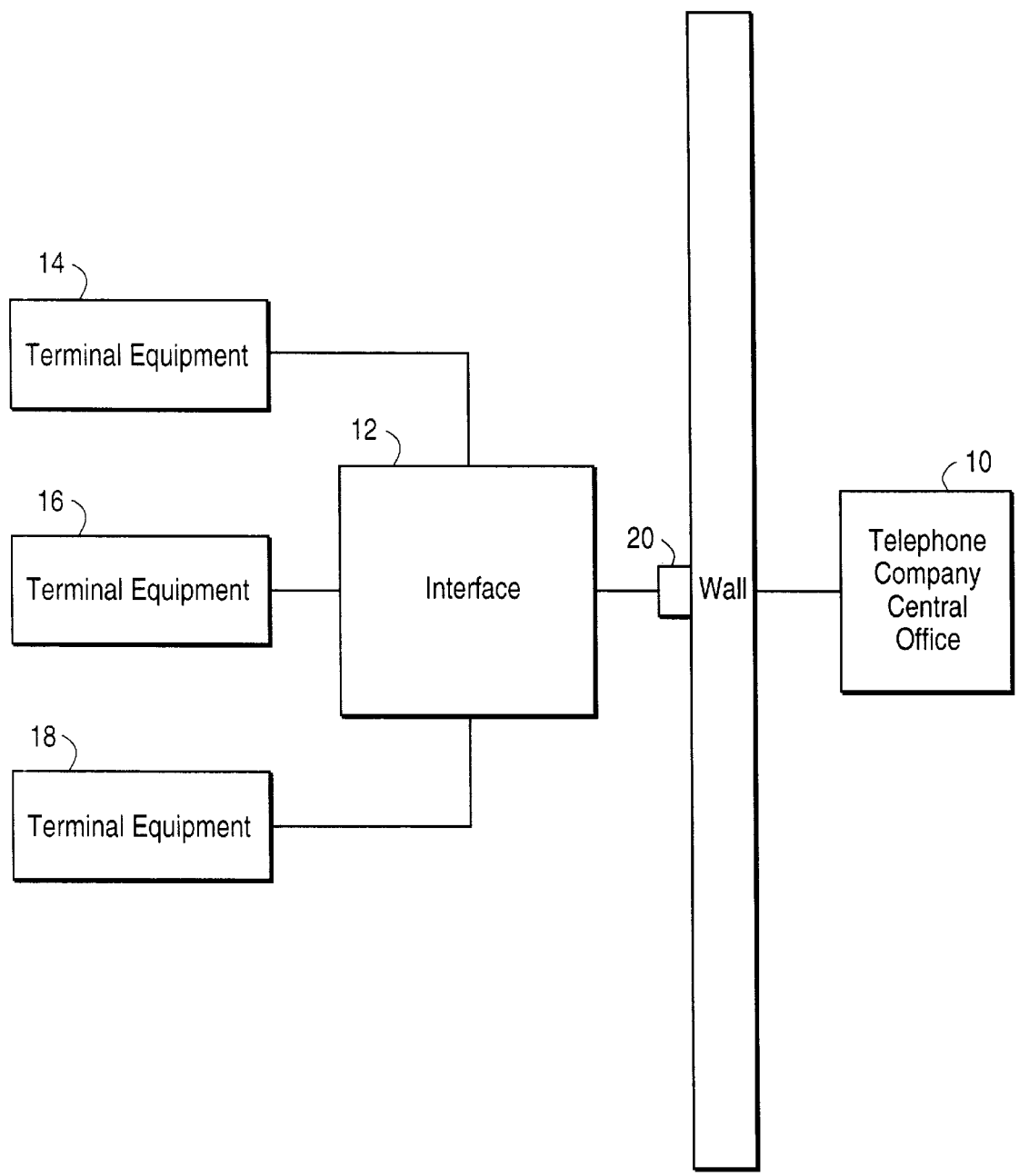
FIG. 1 is a block diagram of an exemplary telecommunications network according to an embodiment of the present invention.

Referring to FIG. 1, an exemplary telecommunications network is shown. Generally, such a network includes terminal equipment 14, 16, 18 such as telephone and facsimile machines connected to an interface 12. As will be discussed below, a number of different devices may be used as the interface 12, which is connected to a jack 20, typically an RJ11, RJ14, or other Universal Service Order Codes (USOC) compliant jack as found in homes and offices, The jack 20 is the actual physical connection used for connecting the interface 12 to the CO 10.

The terminal equipment 14, 16, 18 may include analog terminal equipment (TE2) or digital terminal equipment (TE1), such as telephones, FAX machines or any other telecommunications devices. The interface 12 may include either singly or in combination, a network termination 1 (NT1) device, a network termination 2 (NT2) device such as a PBX, and/or a terminal adaptor (TA), a Telephony Application Programming Interface (TAPI) and/or a Telephony Services Application Programming Interface (TSAPI). TAPI and TSAPI provide the software interface for connecting a digital communications device with a personal computer (PC). Other interfaces may also be used with the present invention, or no interface terminal equipment at all may be used, as is the case with analog devices connected directly to the jack 20.

Figure 8:
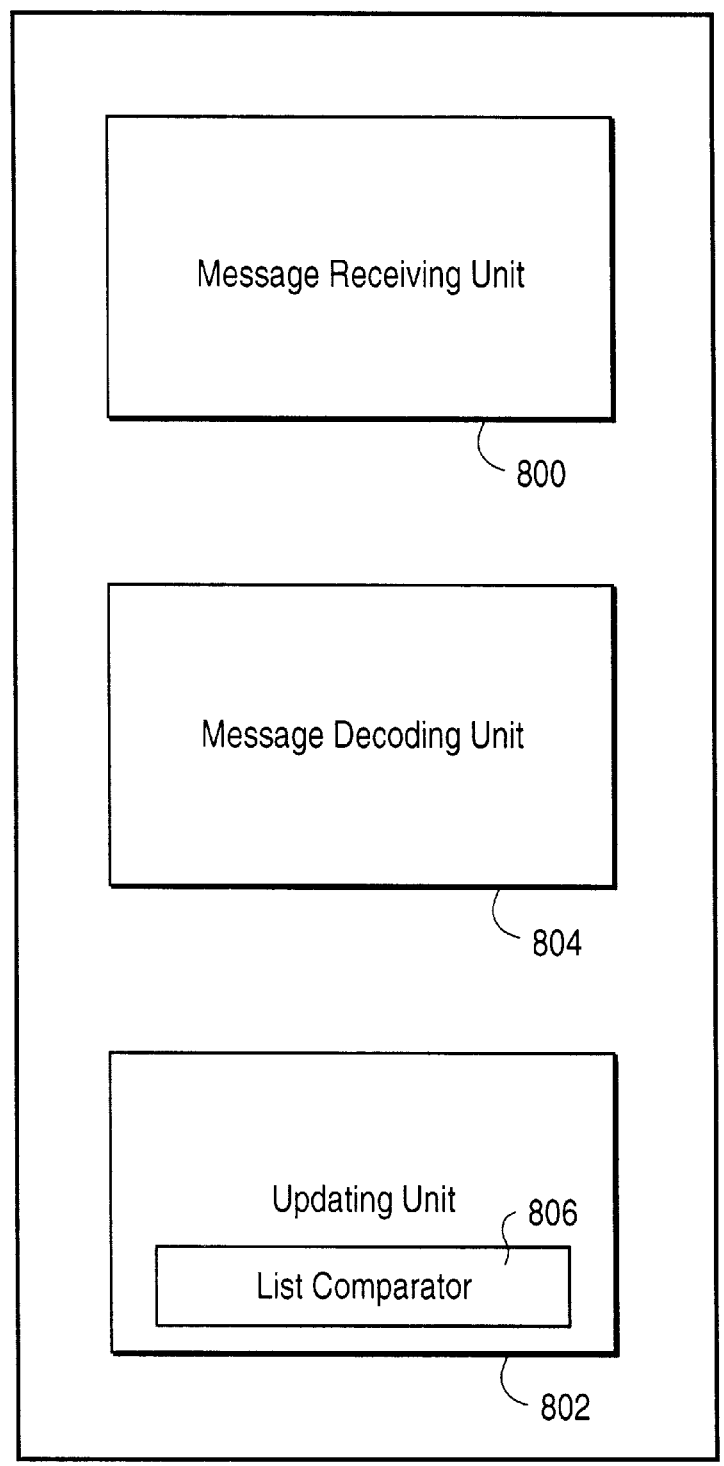
FIG. 8 is a block diagram of an embodiment of the present invention.

As mentioned above, the area code update message is a signal sent by the CO 10 for signaling devices that the area being called is undergoing an area code change and that a new area code has been established for the number being called. Accordingly, each of the terminal equipment devices 14, 16, 18 in accordance with the present invention is responsive to the area code update message from the central office to automatically update its area code list. In particular, as shown in FIG. 8, the system may be formed or provided with a message receiving unit (MRU) 800 for receiving the area code update message, a message decoding unit (MDU) 804 for decoding the message into the appropriate format suitable for different types of devices and an update unit (UU) 802 for enabling the device to update its internal list. The UU 802 may also include a list comparator (LC) 806 for comparing the new area code with area codes in an existing list to prevent duplicate listings. TAPI and TSAPI systems are capable of storing such lists on a PC or communications server.

In particular, the MRU 800 includes a standard ISDN chipset for receiving ISDN signals. MDU 804 includes a standard ISDN chipset for decoding the received ISDN signals. The ISDN chipsets used by the MRU 800 and the MDU 804 may be combined in a single chipset such as the PEB2070 available from Siemens Corporation of Germany. UU 802 and LC 806 may be likewise combined to include a general purpose 16-bit or 32-bit microprocessor or microcontroller such as the Motorola MC68302.

Figure 2:
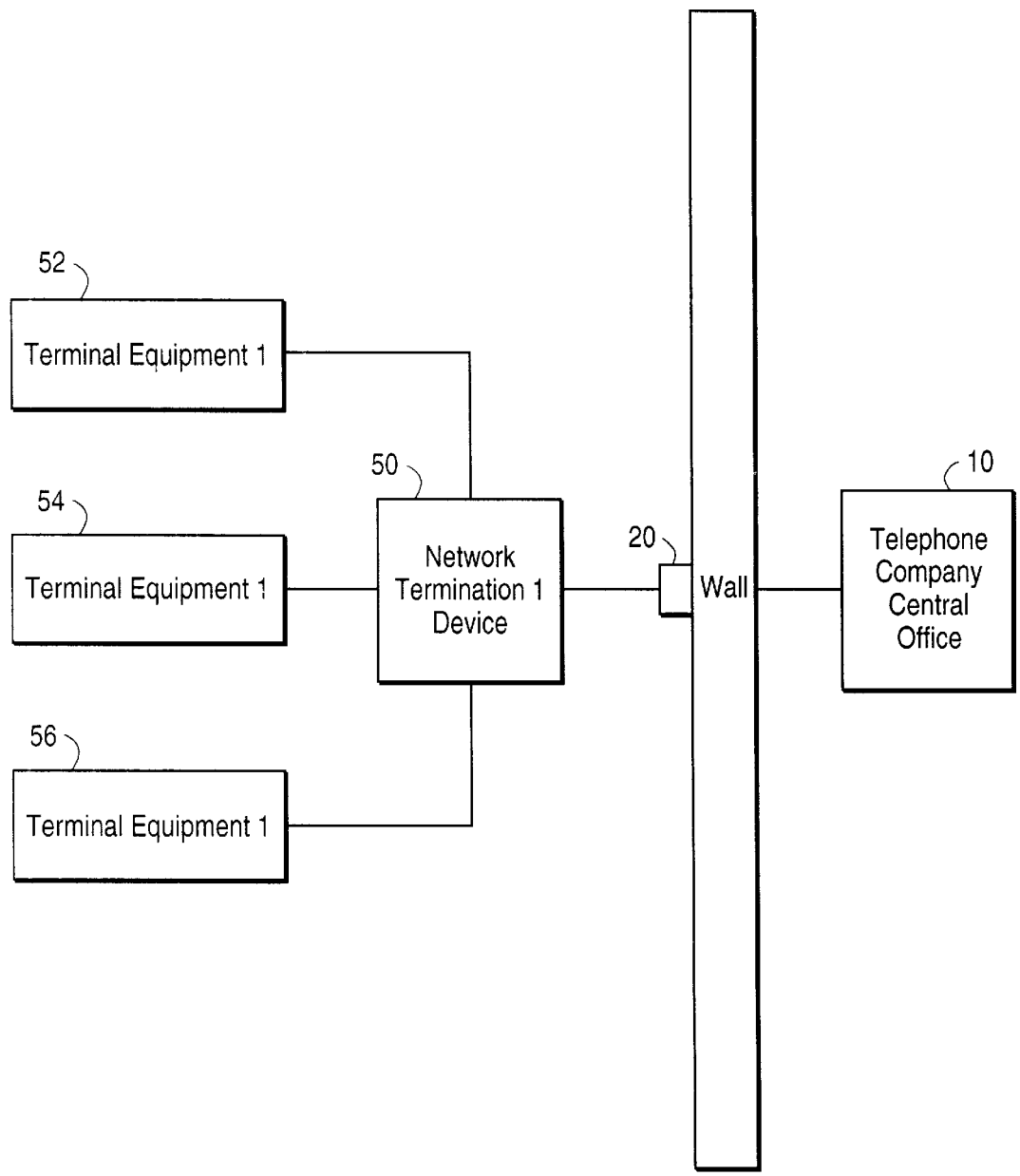
FIG. 2 is a block diagram of a telecommunications network having a single termination device according to an embodiment of the present invention.
Figure 3:
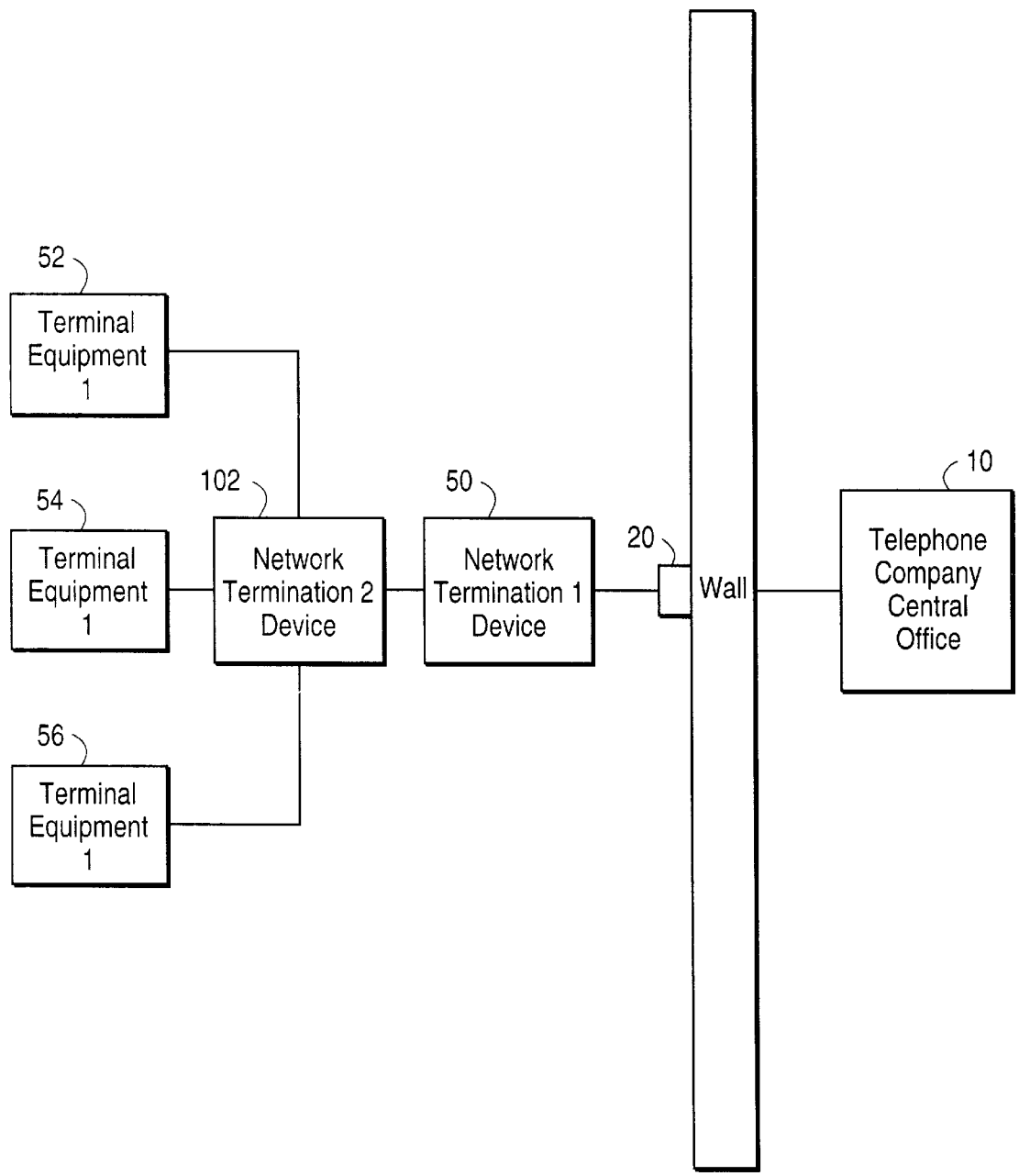
FIG. 3 is a block diagram of an exemplary telecommunications network according to an embodiment of the present invention.

Referring to FIG. 2, an Integrated Services Digital Network (ISDN) telecommunications network is shown wherein the interface 12 is an NT1 device 50 for providing the physical interface between the CO 10 equipment and the user's TE1 devices 52, 54, 56. The NT1 device 50 is used to terminate a U-loop provided by the CO 10. The ISDN U-loop is two conductors that reach from the CO 10 to the customers home or office. On the home or office side of the connection, the U-loop is terminated by the NT1 device. In turn, the NT1 device drives a bus having 4–8 wires, known generally as an S/T bus. The TE1 52, 54, 56 devices are connected to the SIT bus and are digital and/or ISDN type devices such as an ISDN phone, computer or ISDN FAX machine. The S/T interface supports multiple devices simultaneously. Referring to FIG. 3, an ISDN telecommunications network similar to FIG. 2 is shown. However, in this case the NT1 50 is connected to an NT2 102 device, such as a PBX, which is then connected to the TE1 52, 54, 56 devices.

An ISDN system enables data to be transmitted using end-to-end digital connectivity. For example, a call using plain old telephone service (POTS) is transmitted between the CO 10 to the user's home or office telephone in analog form. At the CO 10, the analog call is converted into a digital form wherein the call may be digitally routed through various central office equipment. In contrast, ISDN eliminates the analog digital to conversion, thereby enabling a greater amount of digital data to travel at a faster rate through the ISDN line.

As such, in one embodiment of the present invention, the MRU 800 in the digital device is capable of directly receiving digital messages and can use that capability to receive the area code update message signal from the CO 10. The MDU 804, upon decoding the area code update message signal, compares the new area code with those area codes already present in a preexisting list of area codes using LC 806. Based on the results of the comparison, the UU 802 can then receive the new area code that is being implemented and automatically update its area code list if the new area code has not already been entered into the list.

In the above configuration, as mentioned earlier, the NT1 50 provides the physical interface from the CO 10 to other communications devices, such as PBX 102. The PBX 102, in turn, provides the interface between the NT1 50 to the TE1 52, 54, 56 equipment. As above, the TE1 52, 54, 56 equipment is digital as is the PBX 102. Area code updating in the above network configuration is accomplished when the MRU 800 in devices TE1 52, 54, 56 receives an area code update message from the CO 10. Because the TE1 52, 54, 56 devices are digital, they are able to directly receive and act upon the area code update messages. Once the digital type device receives the area code update message, the UU 802 updates the device area code list accordingly.

A particular application of the present invention is for reprogramming the Service Profile Identification (SPID) number in an ISDN device. In the event that the area code in the directory number of the ISDN device initiating the call changes, the SPID number in the device will need to be reprogrammed with the new area code information. SPIDs are generally used to identify the services and features that the CO 10 switch provides to the ISDN device. When a new ISDN subscriber is added, the CO 10 allocates the subscriber a directory number, i.e. telephone number, consisting of a three digit area code and seven digit telephone number. For example, an ISDN TA generally utilizes the ten digit directory number in its SPID. In many cases, the SPID number is identical to the directory number or it may be the directory number concatenated with other data. In either case, the SPID number must be configured into the device before it will be able to communicate with the CO 10 switch. Once the SPID is configured, the device undergoes an initialization state in which the SPID is sent to the switch. After initialization the SPID is not sent again during the connection.

In the present invention, the ISDN device may use its signaling capability to automatically update its own SPID number. In particular, when the SPID is sent to the switch during initialization of the device, the device will receive the area code update message indicating that the area code for the directory number has changed. Upon receiving the message, the device will then be able to automatically update its SPID with the new information.

Figure 4:
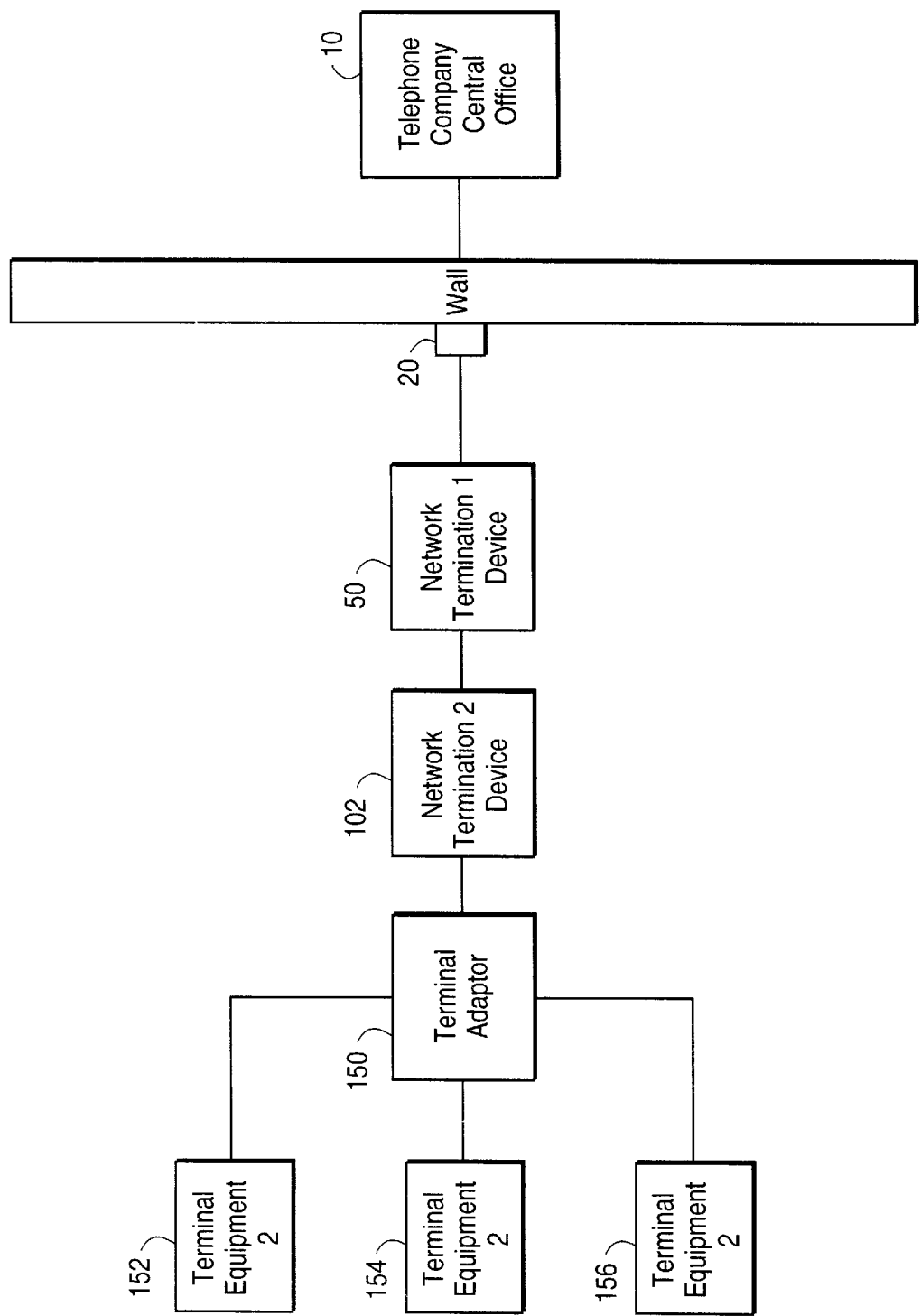
FIG. 4 is a block diagram of an exemplary telecommunications network having a terminal adapter according to an embodiment of the present invention.

Referring to FIG. 4, an ISDN telecommunications network is shown wherein the interface includes an NT1 50, NT2 102, and TA 150. Once again, NT1 interfaces NT2 102, i.e. PBX, to the CO 10 and the PBX 102 connects to the TA 150, which interfaces the TE2 152, 154, 156 equipment to the network. TA 150 is provided because TE2 devices 152, 154, 156 are old analog devices which cannot connect directly to digital PBX Systems. As such, the TE2 devices 152, 154, 156, because they do not have signaling capabilities, cannot directly receive the digital area code update messages directly from a digital network. The TA solves the above problem. In particular, the TA 150, among other things, functions as a convertor to enable the digital phone system to "talk" with the analog devices. Because the PBX is a digital device, it is able to directly receive an area code update message. Furthermore, since it is the PBX 102 that controls access of the TE2 devices to outside lines, updating the PBX 102 area code list will enable the TE2 devices to access numbers in the new area codes. Thus, in the present invention, when the TE2 device initiates a call to an area with an updated area code, the CO 10 will send the area code message along the connection, whereupon the PBX will receive the area code update message and then automatically update its list.

However, many analog devices are not connected to PBX systems and therefore do not have TAs. Typically, such analog devices are mainly used with an analog PBX or in environments where a digital PBX 102 is not present or is not being used. For example, it is known that many offices connect analog FAX machines to direct outside lines rather than routing them through a TA 150 to a PBX 120. In such an instance, PBX 120 updates of area code lists will not affect the FAX machines.

Therefore, in another embodiment of the invention, the analog TE2 device may be designed to receive a version of the area code update message as a Calling Number Delivery (CND) message. CND is also known as Caller ID. In particular, the message decoding unit 804 functions to translate the message into a CND message. Thus, these TE2 devices are enabled to update their area code lists based on the CND message received. Typically, CND systems operate by providing caller information to the receiving party. CND information is typically provided as a 1200 baud, 7 data bits and 1 stop bit data stream and is transmitted to the receiving party after the first ring, but before the second ring. Basic CND supplies only the calling number and the date and time of the call. Enhanced CND may further provide directory information such as the name of the subscriber. During the transmittal of the CND information, the calling party would be able to receive a return message, similar to the area code update signal, in the calling party's CND message indicating that the area is undergoing an area code change. Based on such a signal, the phone or FAX machine can update its internal area code lists, in the same manner as the ISDN and digital devices described above.

The area code updating system also may be used in a variety of digital network configurations that include intelligent devices, such as PCs or servers attached to ISDN devices, such as ISDN phones. Communication between these ISDN devices and Pcs is achieved through the TAPI and/or the TSAPI. The two standards were developed by Intel in association with Microsoft and AT&T in association with Novell, respectfully. The TAPI 2.1 specification is available from Microsoft Corporation of Redmond, Washington and is hereby incorporated by reference. The TSAPI 2.0 specification is available from Novell Company of Utah and is hereby incorporated by reference. Both the TAPI and TSAPI service and parameter definitions are based on the European Computer Manufacturers Association (ECMA) of Geneva, Switzerland, Supported Telecommunications Applications (CSTA) service and protocol definitions, which are hereby incorporated by reference.

TAPI and TSAPI enable the integration of telephony devices with computer applications. In particular, both standards provide defined Application Programming Interfaces (APIs) with which programmers work. Quite simply, these systems provide a communications interface between the telephony device and the computer. In particular, TAPI and TSAPI provide platforms for developing and using computer-telephony integration (CTI) applications which enable computers to control the telecommunications system and devices through a PC. In effect, CTI enables computers to perform many of the functions usually done by the PBXs, including such things as call hold, transfer, conference, etc. Programmers can use TAPI and TSAPI for upgrading the capabilities of the communications network through software without requiring the need for updating the telephone hardware. The present invention may also be used with other available CTI interfaces and applications programs as well.

Figure 5:
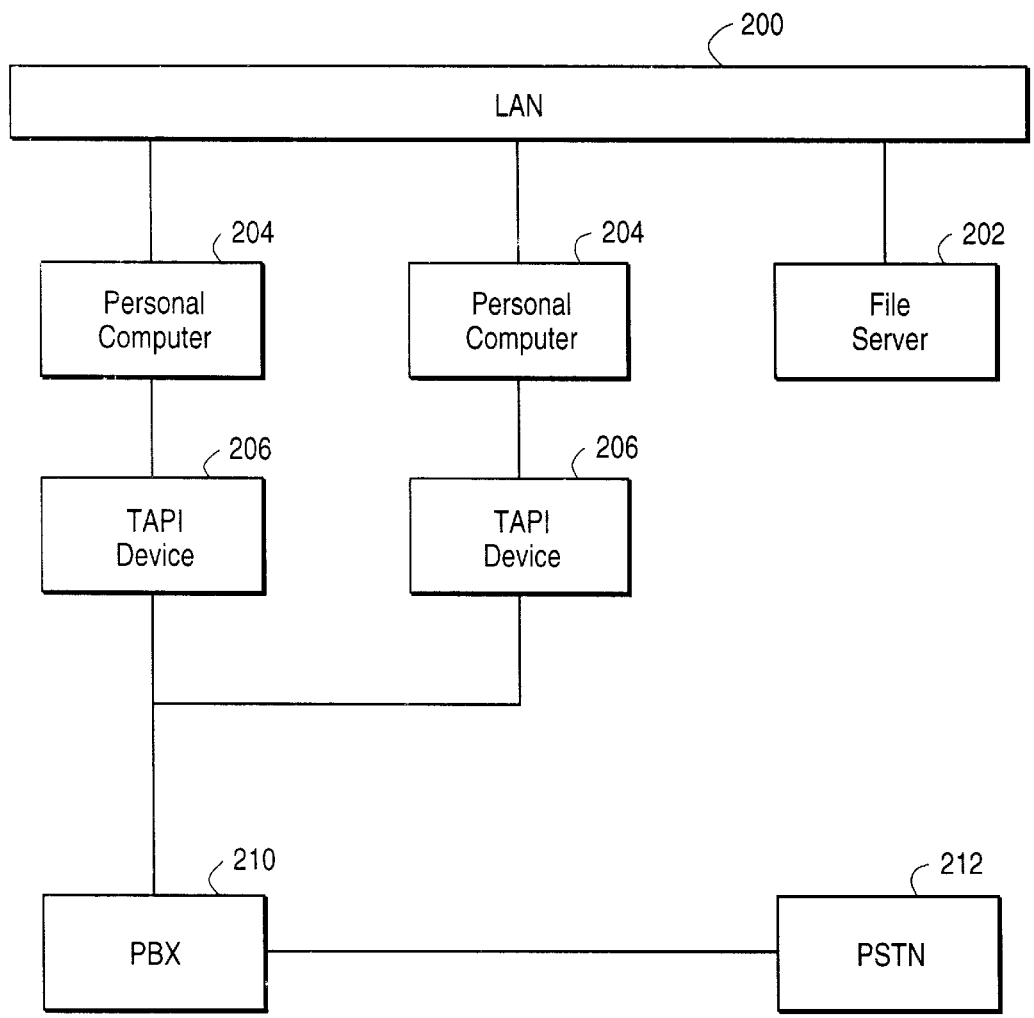
FIG. 5 is a block diagram of a TAPI telecommunications network according to an embodiment of the present invention.

Turning to FIG. 5, a TAPI configuration is shown. As can be seen in such a configuration, the TAPI compatible telephony devices 206 are attached directly and locally to the PCs 204 and are also attached to the PBX 210. The PCs 204 communicate with each other through a Local Area Network (LA) 200 connection which is operated by a file server 202.

The PBX 10 connects to the CO 10 phone lines, i.e., the public switched telephone network (PST) 212. Alternatively, The TAPI devices may also be connected directly to the PSTN.

Therefore, when a call is placed by one of the TAPI devices 206, i.e. an ISDN phone, to an area implementing new area codes, the present invention will enable the TAPI device to receive the new area code message through the PBX 210. The PC 204, which is connected to the TAPI device 206, is also able to receive updates of the area code information through the TAPI connection. The TAPI device, upon receiving the area code update signal from the CO 10 will cause a TAPI compliant message to be generated through which the PC may be updated via the LA 200.

For example, in a TAPI system, a user can store telephone number information in applications and address books in the PC. Generally, according to established standards, the information is stored as the country code plus the area code plus the local directory number, in what is known as location independent form. Applications then request TAPI to convert the number into a series of dialable digits and other dialing instructions needed to complete the call. Therefore, in the present invention, upon completion of a call to an area undergoing an area code change, TAPI will receive an area code update message from the CO 10. TAPI will then generate the proper protocol to enable the system to update the number information stored in the address books and applications, thereby updating the area code.

Figure 6:
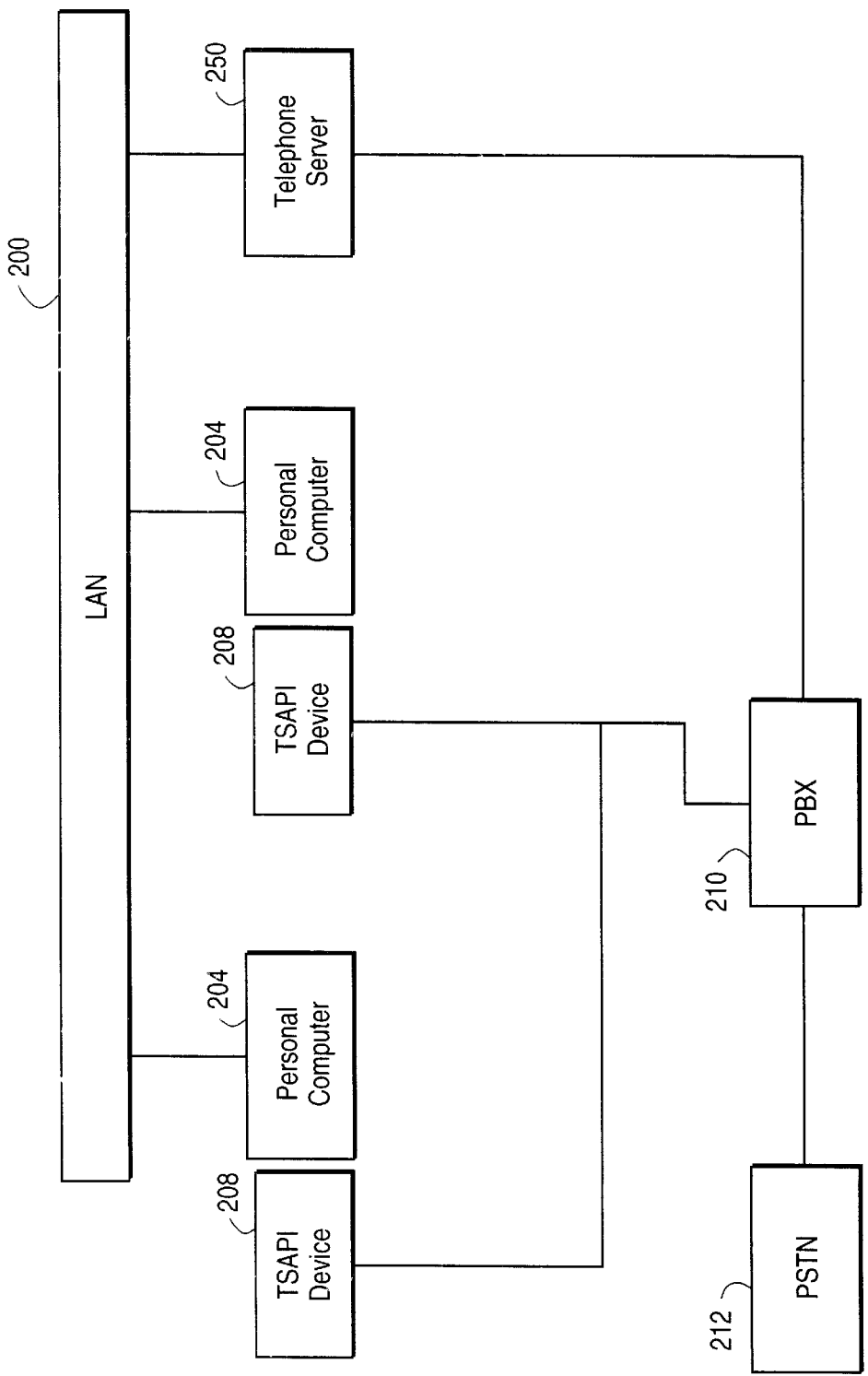
FIG. 6 is a block diagram of a TSAPI telecommunications network according to an embodiment of the present invention.

The TSAPI configuration, as shown in FIG. 6 operates in a substantially identical manner to the TAPI configuration discussed above. In addition, it is to be noted that the TAPI compatible devices 206 and TSAPI compatible devices 208 may generally may be any digital or ISDN type device. It should further be noted that, as in most types of proprietary software applications, TAPI and TSAPI commands may not be interchangeable or compatible. Furthermore, in the TSAPI configuration, the area code update message is received by the TSAPI device and then sent to the PCs 204 through the TSAPI telephone server 250.

Figure 7:
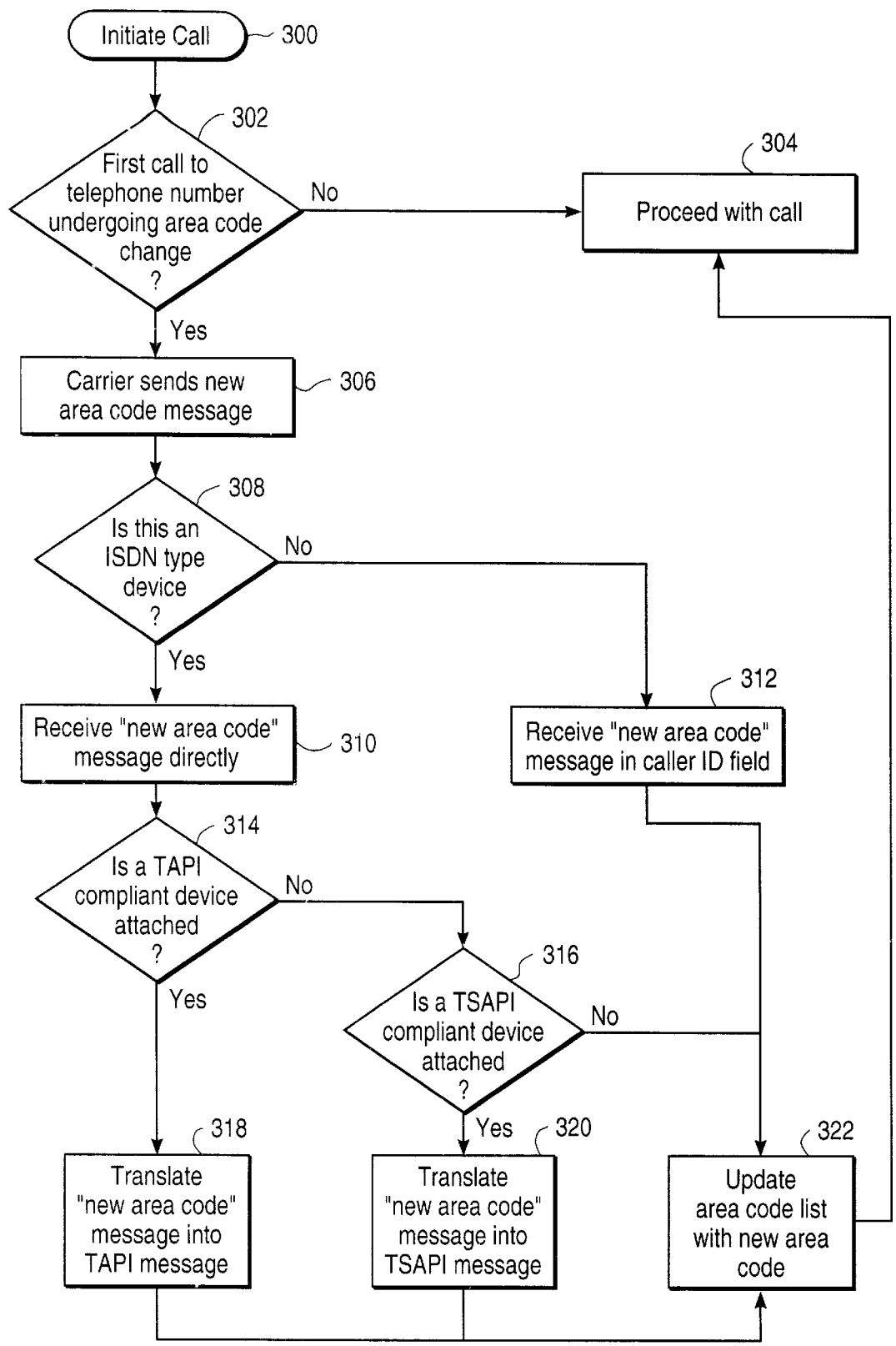
FIG. 7 is a flow diagram of the updating system according to an embodiment of the present invention.

Referring to FIG. 7, a flow diagram is shown depicting an area code updating system for enabling various telecommunications devices to automatically update area code lists. In step 300, a user initiates a call to a telephone number in an area undergoing an area code change. In step 302, the system will detect the area code update message and will determine whether the area code list has been previously updated with the new area code information. If the system determines that the area code list is current, the call will proceed in step 304. However, if the system determines that it has not yet updated its area code list, the system will accept the area code update message in step 306. At that point, in step 308, the system determines the type of device initiating the call. If the device is not a digital or ISDN device, the systems will receive the new area code message in a CND message in step 312. The system will then proceed to update the area code list in step 322 and will proceed with the call in step 304.

If the device is digital, then in step 310, the device will directly receive the new area code message. At that point, the system will determine in step 314 if the device is TAPI compliant. If the device is not TAPI compliant, the system determines whether the device is TSAPI compliant in step 316. If it is not TSAPI compliant, the area code list for the digital device is updated in step 322. However, if it is determined in steps 314 or 316 that the device is either TAPI or TSAPI compliant, then the update message is also translated into TAPI or TSAPI compliant update message in step 318 or 320 and the area code list is updated. The call then proceeds to completion in step 304.

Thus, it can be seen that the present system may be used for automatic updating of area code lists. Furthermore, the present system is not limited to just area code updating, but may be used for updating other device information if needed. For example, the invention may be used in the future to automatically update the present ten-digit telephone numbers to the anticipated 15-digit telephone numbers.

Obviously, many modifications and variations of the present invention are possible in light of the above teachings. Thus, it is to be understood that, within the scope of the amended claims, the invention may be practiced otherwise then as specifically described above.

What is claimed is:

1. An information updating system, comprising:
   a telecommunications device for communicating with one or more remote telecommunications devices over one or more communications lines;
   a message receiving unit for receiving a directory number update message, said directory number update message comprising a non-voice data signal;
   an update unit responsive to said receiving unit receiving said update message for modifying callable directory numbers in one or more internal lists in said telecommunications device, said modifying callable directory numbers comprising updating an area code of said one or more callable directory numbers; and
   a message decoding unit for decoding said one or more messages;
   wherein said message decoding unit determines whether said directory number update message is in a digital format or a caller identification format.

2. An information updating system as recited in claim 1, wherein said messages are area code updating messages.

3. An information updating system as recited in claim 2, further including a list comparator for determining whether said area code update message includes an area code already present in said one or more internal lists.

4. An information updating system as recited in claim 1, wherein, if said message decoding unit determines that said directory number update message is in a digital format, said system determines if said directory number update message in a TAPI or TSAPI format.

5. A method for updating directory number information in a telecommunications device, comprising:
   communicating with one or more remote telecommunications devices over one or more communications lines;
   receiving an area code update message, said area code update message comprising a non-voice data signal;
   modifying one or more internal lists in said telecommunications device responsive to said receiving unit receiving said update message, said one or more internal lists comprising lists of callable numbers;
   decoding said area code update message in response to said receiving; and
   determining whether said area code update message is in a digital format or a caller identification format.

6. A method according to step 5, wherein said messages are area code updating messages.

7. A method according to claim 5, further comprising comparing said internal list to said area code update message for determining whether said area code is present in said one or more internal lists.

8. A method as recited in claim 5, further comprising determining if said directory number update message is in a TAPI or TSAPI format if said area code update message is determined to be in a digital format.

9. An information updating system, comprising:
   means for communicating with one or more remote telecommunications devices over one or more communications lines;
   means for receiving and decoding an area code update message, said area code update message comprising a non-voice data signal; and
   means responsive to said receiving means receiving said update message for modifying callable directory numbers in one or more internal lists in said telecommunications devices, said modifying callable directory numbers comprising updating an area code of said one or more callable directory numbers;
   wherein said decoding means determines if said area code update message is in a digital format or a caller identification format.

10. An information updating system as recited in claim 9, wherein said communicating means includes one or more TAPI compatible communications devices.

11. An information updating system as recited in claim 9, wherein said communicating means includes one or more TSAPI compatible communications devices.

12. An information updating system as recited in claim 11, wherein said communicating means includes digital and analog communications devices.

* * * * *